Patented Oct. 7, 1930

1,777,367

UNITED STATES PATENT OFFICE

CECIL HOLLINS AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF AERATED WATERS, SPARKLING DRINKS AND THE LIKE

No Drawing. Original application filed August 5, 1927, Serial No. 211,002, and in Great Britain August 19, 1926. Divided and this application filed July 9, 1928. Serial No. 291,473.

In our copending application Serial No. 211,002 of which the present application is a division, we have set forth and claimed certain new and useful improvements in the manufacture of aerated waters, sparkling drinks and the like. The present invention relates to effervescent salt preparations and the like suitable for preparing the effervescent potable liquids of said copending application and it further relates to processes for making these effervescent salt preparations and the like.

One of the disadvantages of ordinary aerated waters is that as soon as the liquid is poured into a glass, practically all the gas with which it is charged is given off at once and the liquid becomes "flat" and loses its sparkle.

We have discovered that if a small proportion, e. g. 0.01–0.1 per cent of certain substances hereinafter described be included in the ingredients of the liquid before or after aeration, the liquid acquires the property of retaining the gas with which it is charged and the latter is evolved more gradually on exposure to air, with formation in most cases of a "froth".

The substances we use for this purpose belong to the classes known as dispersing agents and wetting-out agents, namely, the sulphonic acids derived from formaldehyde-naphthalene or formaldehyde-phenol condensation products, the alkylnaphthalene sulphonic acids, the substances prepared from mineral oils and isopropyl alcohol sulphonated according to co-pending application No. 195,585 filed by one of us, Ernest Chapman and another, ligninsulphonic acids, naphthenic acids, taurocholic acid, sulphonated higher fatty acids, and the like.

According to the present invention, these substances (usually in the form of their sodium salts) are added in the from of a dry powder. It is understood, of course, that the substances used should be free from poisonous impurities.

A method of applying our invention is illustrated by, but not limited to, the following example:

*Example.*—1 part by weight of one of the defined dispersing agents is incorporated with 500 parts by weight of an effervescent saline mixture of the ordinary type, containing an alkaline carbonate or bicarbonate, and a solid acid or acid salt with the usual addition of sodium sulphate or magnesium sulphate and flavouring matter, if desired. When one or two teaspoons-full are stirred into a glass of water in the customary manner, the mixture effervesces as usual, but after the first effervescence has ceased, the quiescent liquid remains "sharp" and palatable, instead of "flat" and unpleasant to the taste.

What we claim and desire to secure by Letters Patent is:—

1. In the manufacture of effervescent salt preparations and the like, the process which comprises adding to such effervescent salt preparations a sulphonic acid of high molecular weight belonging to the class of wetting-out and dispersing agents.

2. In the manufacture of effervescent salt preparations and the like, the process which comprises adding to such effervescent salt preparations sulphonated isopropylated petroleum fractions.

3. Effervescent salt preparations and the like containing as an added ingredient a sulphonic acid of high molecular weight belonging to the class of wetting-out and dispersing agents.

4. Effervescent salt peparations and the like containing as an added ingredient sulphonated isopropylated petroleum fractions.

In testimony whereof we affix our signatures.

CECIL HOLLINS.
ERNEST CHAPMAN.